United States Patent [19]
Ohnishi et al.

[11] Patent Number: 5,960,154
[45] Date of Patent: *Sep. 28, 1999

[54] IMAGE PROCESSING APPARATUS HAVING ENLARGEMENT REDUCTION AND PIXEL PROCESSING FACILITIES

[75] Inventors: Shinji Ohnishi, Yokohama; Shinichi Hatae, Kawasaki, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/675,403

[22] Filed: Jul. 2, 1996

[30] Foreign Application Priority Data

Jul. 11, 1995 [JP] Japan ................... 7-197140

[51] Int. Cl.$^6$ ............... H04N 5/91; H04N 5/225
[52] U.S. Cl. ............... 386/117; 386/107; 386/46
[58] Field of Search ............... 386/46, 109, 111, 386/112, 1, 27, 33, 34, 117, 118, 107, 38; 360/32; 348/240, 222; H04N 5/91, 5/225

[56] References Cited

U.S. PATENT DOCUMENTS 4,903,132  2/1990  Yamawaki ................... 358/209
5,327,264  7/1994  Iyama ....................... 348/242
5,446,831  8/1995  Yamashita et al. ............ 395/102
5,517,239  5/1996  Nakayama ................... 348/222

FOREIGN PATENT DOCUMENTS 0421769  4/1991  European Pat. Off. .
0428310  5/1991  European Pat. Off. .
0560549  9/1993  European Pat. Off. .

OTHER PUBLICATIONS

International Publication No. WO 95/01047, published Jan. 5, 1995.

International Publication No. WO 95/16323 published Jun. 15, 1995.

Patent Abstracts of Japan No. JP–A–07 095539, vol. 95, No. 004, published Apr. 7, 1995.

*Primary Examiner*—Robert Chevalier
*Attorney, Agent, or Firm*—Robin, Blecker & Daley

[57] ABSTRACT

An image processing apparatus having an input unit for inputting an image signal, and a signal processing unit capable of selectively executing one of enlarging and reducing processing and pixel conversion processing for the image signal.

37 Claims, 5 Drawing Sheets

$$y1 = y3 = (480 - \frac{480}{a}) \div 2$$

$$y2 = \frac{480}{a}$$

$$x1 = x3 = (720 - \frac{720}{b}) \div 2$$

$$x2 = \frac{720}{a}$$

IMAGE PROCESSING APPARATUS HAVING ENLARGEMENT REDUCTION AND PIXEL PROCESSING FACILITIES

BACKGROUND OF THE INVENTION

1. Field of the Invention

The present invention relates to an image processing apparatus and, more particularly, to pixel conversion processing of an image signal.

2. Related Background Art

A conventional image recording/reproduction apparatus comprises a recording unit for recording a video signal picked up by, e.g., a video camera on a recording medium such as a magnetic tape, and a reproduction unit for reproducing the video signal recorded by the recording unit. The video signal reproduced by the reproduction unit is converted in correspondence with a predetermined television system (e.g., NTSC system), and is output to an equipment such as a monitor.

As a method of printing a video signal, a video printer is used.

For example, when an analog image signal is printed by a video printer, the video printer converts vertically elongated pixels of the NTSC system into square pixels by re-sampling the input analog image signal, stores image data consisting of the converted pixels in its internal frame memory having a predetermined capacity, performs image processing for the image data stored in the frame memory, and forms an image represented by the analog video signal on a transfer medium. The internal frame memory of the video printer has a capacity for, e.g., 640×480 pixels.

When a digital video signal output from an image recording/reproduction apparatus which can record/reproduce a digital video signal is to be printed, a video printer having a digital I/F for receiving the digital video signal is used.

In this video printer, as in the video printer for receiving the analog video signal, vertically elongated pixels of the input digital video signal are converted into square pixels, the image data size is adjusted to the capacity of its internal frame memory, and the adjusted image data is stored in the frame memory.

In this manner, when a conventional image recording/reproduction apparatus outputs a video signal to a video printer, the video printer performs processing such as pixel conversion in correspondence with the characteristics of the video signal. For this reason, the image recording/reproduction apparatus does not execute any pixel conversion processing in correspondence with the characteristics of the video printer as the destination.

However, as described above, since the conventional image recording/reproduction apparatus does not execute any pixel conversion processing in correspondence with the characteristics of a destination equipment such as a video printer, when the conventional image recording/reproduction apparatus is set to be able to execute pixel conversion processing in correspondence with the characteristics of the destination equipment, a means for executing the pixel conversion processing must be added, resulting in an increase in cost.

SUMMARY OF THE INVENTION

The present invention has been made in consideration of the above situation and has as its object to provide an image processing apparatus which can perform pixel conversion processing without increasing cost.

In order to achieve the above object, according to one preferred embodiment of the present invention, an image processing apparatus comprises input means for inputting an image signal, and signal processing means capable of selectively executing one of enlarging and reducing processing and pixel conversion processing for the image signal.

Other objects, features and advantages of the invention will become apparent from the following detailed description taken in conjunction with the accompanying drawings.

DETAILED DESCRIPTION OF THE PREFERRED EMBODIMENTS

The preferred embodiment of the present invention will be described hereinafter with reference to the accompanying drawings.

Figure 1:
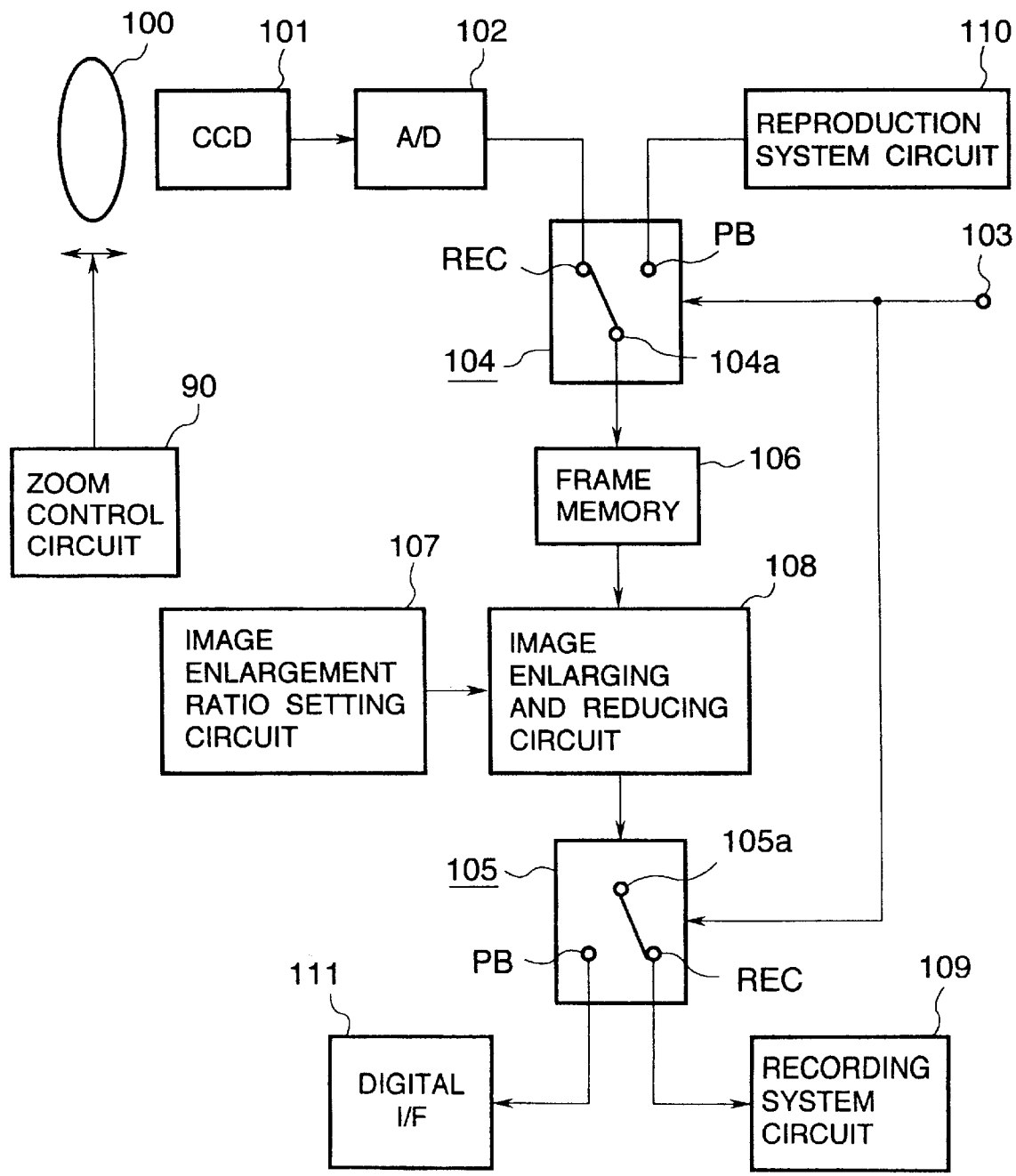
FIG. 1 is a block diagram showing the arrangement of a digital image recording/reproduction apparatus according to an embodiment of the present invention.

FIG. 1 is a block diagram showing the arrangement of a digital image recording/reproduction apparatus according to an embodiment of the present invention.

As shown in FIG. 1, the digital image recording/reproduction apparatus comprises an optical system 100 which can perform a zoom operation, and a CCD (charge-coupled device) 101 for converting an object image caught by the optical system 100 into an electrical signal by photoelectric conversion. The maximum zoom ratio in the zoom operation of the optical system is set to be a predetermined value, e.g., ×12. The zoom ratio control is attained by a zoom control circuit 90.

An electrical signal output from the CCD 101 is converted into digital image data by an A/D converter (to be referred to as "A/D" hereinafter) 102. The image data output from the A/D 102 is supplied to a selection switch 104.

The selection switch 104 has two input terminals, i.e., REC and PB terminals, and one output terminal 104a. The REC terminal is connected to the output terminal of the A/D 102, and the PB terminal is connected to the output terminal of a reproduction system circuit 110 for reproducing image data recorded on a recording medium such as a magnetic tape. The output terminal 104a is connected to a frame memory 106.

The frame memory 106 comprises a memory having a capacity for a predetermined number of pixels. For example, the memory capacity is set to be 720×480 pixels with respect to image data corresponding to the NTSC system.

Image data read out from the frame memory 106 is supplied to an image enlarging and reducing circuit 108. The image enlarging and reducing circuit 108 performs enlarging and reducing processing (i.e., electronic zoom processing) for the image data read out from the frame memory 106 in a recording operation mode, and performs pixel conversion processing for the image data read out from the frame memory 106 in a reproduction operation mode.

In the enlarging and reducing processing performed in the recording operation mode, enlarging and reducing processing is executed in accordance with the enlargement ratios set by an image enlargement ratio setting circuit 107, and image data having the predetermined number of pixels is output. In the case of the NTSC system, image data to be output is one-frame image data having 720×480 pixels.

In contrast to this, in the pixel conversion processing performed in the reproduction operation mode, the number of pixels of image data read out from the frame memory 106 is converted into that matching the equipment characteristics of a destination in accordance with the enlargement ratios set by the image enlargement ratio setting circuit 107, and the image data with the converted number of pixels is output.

The image enlargement ratio setting circuit 107 sets the enlargement ratios for the enlarging and reducing processing or the pixel conversion processing of the image enlarging and reducing circuit 108 on the basis of externally input data.

The enlargement ratios for the enlarging and reducing processing of the image enlarging and reducing circuit 108 are set in accordance with the zoom ratio set by a user's operation.

For example, assuming that the maximum zoom ratio of a zoom lens in the optical system is ×12 and the maximum enlargement ratios in the enlarging and reducing processing of the image enlarging and reducing circuit 108 are ×24, if the zoom ratio is set to be a value equal to or lower than the maximum zoom ratio (×12) of the zoom lens in the optical system, a vertical enlargement ratio of ×1 and a horizontal enlargement ratio of ×1 are set as the enlargement ratios for the enlarging and reducing processing of the image enlarging and reducing circuit 108. More specifically, the set zoom ratio equals that obtained by the zoom operation of the optical system.

In contrast to this, when a zoom ratio x is set to be a value falling within the range from ×12 as the maximum zoom ratio of the zoom lens in the optical system to ×24, the vertical and horizontal enlargement ratios, m, for the enlarging and reducing processing of the image enlarging and reducing circuit 108 are calculated on the basis of a set zoom ratio n using the following equation (1):

$$m = n/12 \qquad (1)$$

For example, when the zoom ratio x is set to be ×24, vertical and horizontal enlargement ratios of ×2 are respectively set as the enlargement ratios for the enlarging and reducing processing of the image enlarging and reducing circuit 108.

As the enlargement ratios for the pixel conversion processing of the image enlarging and reducing circuit 108, the vertical and horizontal enlargement ratios are set, so that the number of pixels of image data read out from the frame memory 106 equals that corresponding to a destination equipment selected by the user. Upon setting the enlargement ratios, a table that stores the correspondence between destination equipments and their pixel sizes is stored in a storage device such as a ROM, and the destination equipment is selected on a menu screen to load the pixel size corresponding to the selected destination equipment, and the vertical and horizontal enlargement ratios are set on the basis of the loaded pixel size.

Image data output from the image enlarging and reducing circuit is supplied to a selection switch 105. The selection switch 105 has one input terminal 105a and two output terminals, i.e., REC and PB terminals. The REC terminal is connected to the input terminal of a recording system circuit 109, and the PB terminal is connected to the input terminal of a digital I/F (interface) 111.

The recording system circuit 109 digitally records image data input via the selection switch 105 on a recording medium such as a magnetic tape.

The digital I/F 111 comprises an interface for supplying image data input via the selection switch 105 to a destination equipment, and its output terminal is connected to the destination equipment.

The switching operations of the selection switches 104 and 105 are controlled on the basis of a control signal input from a control circuit (not shown) via an operation mode input terminal 103. When the operation mode is set to be the recording mode, the selection switches 104 and 105 respectively select the REC terminals on the basis of the control signal; when the operation mode is set to be the reproduction mode, the selection switches 104 and 105 respectively select the PB terminals on the basis of the control signal.

Figure 2:
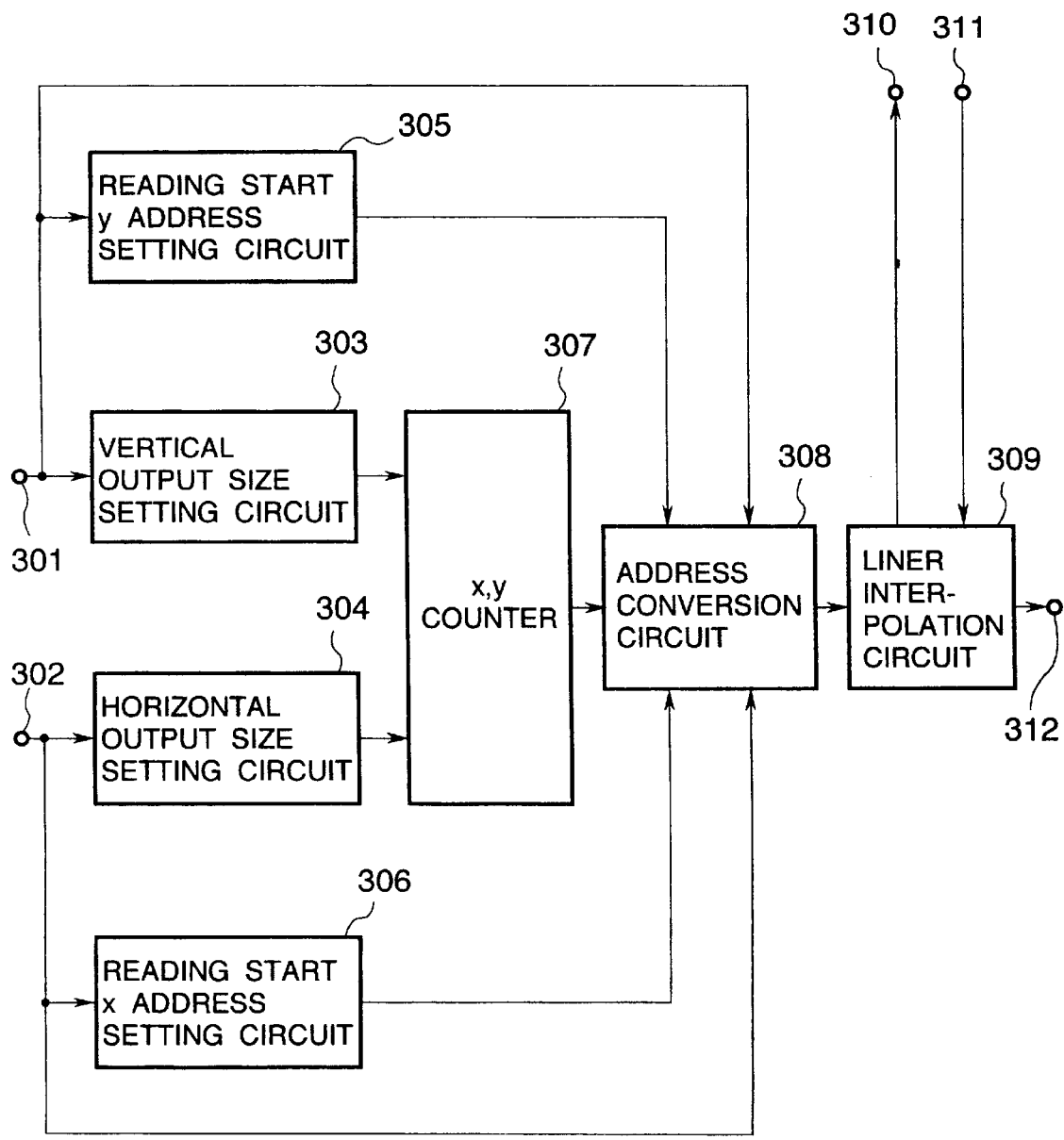
FIG. 2 is a block diagram showing the arrangement of an image enlarging and reducing circuit arranged in the digital image recording/reproduction apparatus shown in FIG. 1.

The arrangement of the image enlarging and reducing circuit 108 will be described below with reference to FIG. 2. FIG. 2 is a block diagram showing the arrangement of the image enlarging and reducing circuit arranged in the digital image recording/reproduction apparatus shown in FIG. 1.

As shown in FIG. 2, the image enlarging and reducing circuit 108 comprises input terminals 301 and 302 for respectively receiving the vertical and horizontal enlargement ratios set by the image enlargement ratio setting circuit 107.

The vertical enlargement ratio input to the input terminal 301 is supplied to a vertical output size setting circuit 303, a reading start y address setting circuit 305, and an address conversion circuit 308. The horizontal enlargement ratio input to the input terminal 302 is supplied to a horizontal output size setting circuit 304, a reading start x address setting circuit 306, and the address conversion circuit 308.

The vertical output size setting circuit 303 sets the vertical output size in the recording operation mode on the basis of equations (2) and (3) below:

When vertical enlargement ratio≧1, vertical output size=480 (2)

When vertical enlargement ratio<1, vertical output size=480×vertical enlargement ratio (3)

The horizontal output size setting circuit 304 sets the horizontal output size in the recording operation mode on the basis of equations (4) and (5) below:

When horizontal enlargement ratio≧1, horizontal output size=720 (4)

When horizontal enlargement ratio<1, horizontal output size=720×horizontal enlargement ratio (5)

The reading start y address setting circuit 305 sets the reading start y address in the recording operation mode on the basis of equations (6) and (7) below:

When vertical enlargement ratio≦1, start y address=0 (6)

When vertical enlargement ratio>1, start y address=(480—480/vertical enlargement ratio)/2 (7)

The reading start x address setting circuit 306 sets the reading start x address in the recording operation mode on the basis of equations (8) and (9) below:

When horizontal enlargement ratio≦1, start x address=0     (8)

When horizontal enlargement ratio>1, start x address=(720—720/
horizontal enlargement ratio)/2     (9)

In contrast to this, in the reproduction operation mode, the vertical output size setting circuit 303, the reading start y address setting circuit 305, the horizontal output size setting circuit 304, and the reading start x address setting circuit 306 set data as indicated below in place of those set on the basis of equations (2) to (9) above. Note that the following setting data are used for conversion from image data of the NTSC system into that of 640×480 pixels, and are set under the condition that the vertical enlargement ratio is set to be ×1, and the horizontal enlargement ratio is set to be ×(640/720).

Vertical output size=480

Horizontal output size=640

Start y address=0

Start x address=0

The vertical and horizontal output sizes from the vertical and horizontal output size setting circuits 305 and 306 are supplied to an x,y counter 307. The x,y counter 307 incorporates x and y counters, and the counter values of these counters respectively indicate the x and y addresses of an image to be output.

In an initial state, the values of the counters are set to be an initial value "0". While relationship that the counter value of the x counter is smaller than the horizontal output size is held, the count-up operation of the x counter is performed, and the counter values of the x and y counters are output. When relationship that the counter value of the x counter is equal to the horizontal output size is held, the counter value of the x counter is set to be "0", and the counter values of the x and y counters are output. When relationship that the counter value of the y counter is equal to the vertical output size is held, the counter value of the y counter is set to be "0", and the x and y counters are reset to the initial state.

The counter values indicating the x and y addresses and supplied from the x,y counter 307 are supplied to the address conversion circuit 308. The address conversion circuit 308 receives the start y address supplied from the reading start y address setting circuit 305, the start x address supplied from the reading start x address setting circuit 306, and the vertical and horizontal enlargement ratios input to the input terminals 301 and 302, in addition to the counter values from the x,y counter 307. The address conversion circuit 308 converts x and y addresses indicated by the counter values supplied from the x,y counter 307 on the basis of the start y address supplied from the reading start y address setting circuit 305, the start x address supplied from the reading start x address setting circuit 306, and the vertical and horizontal enlargement ratios input to the input terminals 301 and 302, thereby calculating pixel addresses on the frame memory 106 corresponding to those of an output image. The calculated pixel addresses are supplied to a linear interpolation circuit 309.

The linear interpolation circuit 309 outputs an address control signal from an output terminal 310 to the frame memory 106 on the basis of the input address data to load pixel data stored in the frame memory 106. Linear interpolation is performed based on the loaded pixel data provided at terminal 311, and pixel data obtained by the linear interpolation are output as output pixel data from an output terminal 312.

Figure 3:
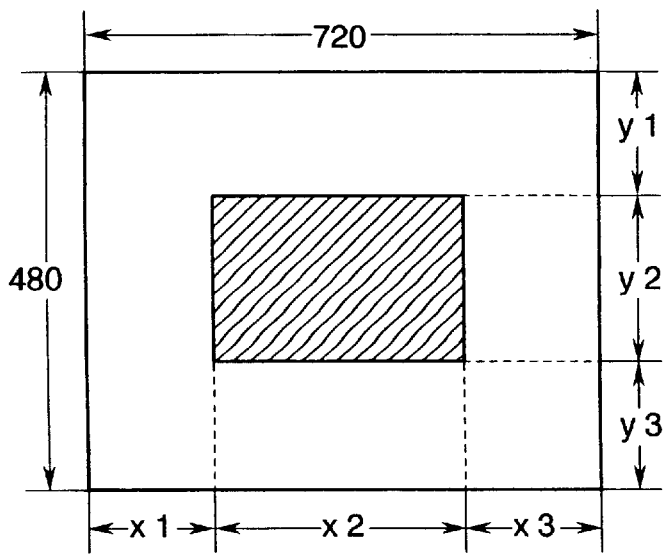
FIG. 3 is a view of the pixel layout for explaining the operation of the image enlarging and reducing circuit arranged in the digital image recording/reproduction apparatus shown in FIG. 1.

The operation of the image enlarging and reducing circuit 108 will be described below with reference to FIG. 3. FIG. 3 is a view of the pixel layout for explaining the operation of the image enlarging and reducing circuit arranged in the digital image recording/reproduction apparatus shown in FIG. 1. FIG. 3 illustrates image data of the NTSC system in the frame memory in correspondence with the pixel layout on the screen.

For example, when the vertical enlargement ratio is set to be xa, and the horizontal enlargement ratio is set to be xb in the recording operation mode, the image enlarging and reducing circuit 108 reads out pixel data indicated by a hatched portion in FIG. 3 from the frame memory 106, performs enlarging processing (i.e., electronic zoom processing) at a predetermined zoom ratio, and outputs an image having a predetermined number of pixels, i.e., 720× 480 pixels. The coordinate position of the upper left point of the hatched portion is calculated based on the start x and y addresses.

In contrast to this, when each enlargement ratio is set to be ×1, image data stored in the frame memory 106 is output as output image data.

In the reproduction operation mode, the pixel conversion processing for converting image data of the NTSC system into that having pixels the number of which corresponds to the characteristics of a destination equipment is performed. For example, as described above, when the destination equipment is a video printer which incorporates a frame memory having a capacity for 640×480 pixels, conversion from image data of the NTSC system into that having 640×480 pixels is performed under the condition that the vertical enlargement ratio is set to be ×1, and the horizontal enlargement ratio is set to be ×(640/720), as described above.

Figure 4A:
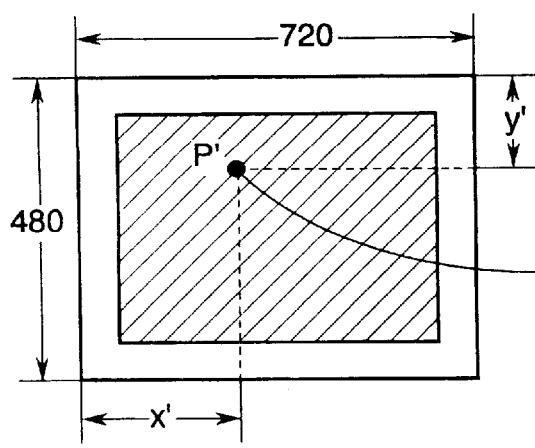
FIGS. 4A and 4B are views of the pixel layout for explaining the operation of an address conversion circuit arranged in the image enlarging and reducing circuit shown in FIG. 2.
Figure 4B:
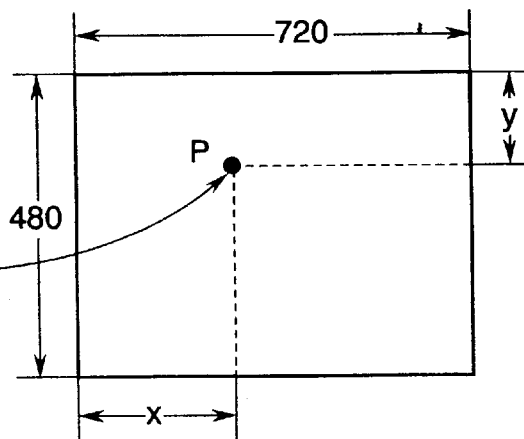
Figure 5:
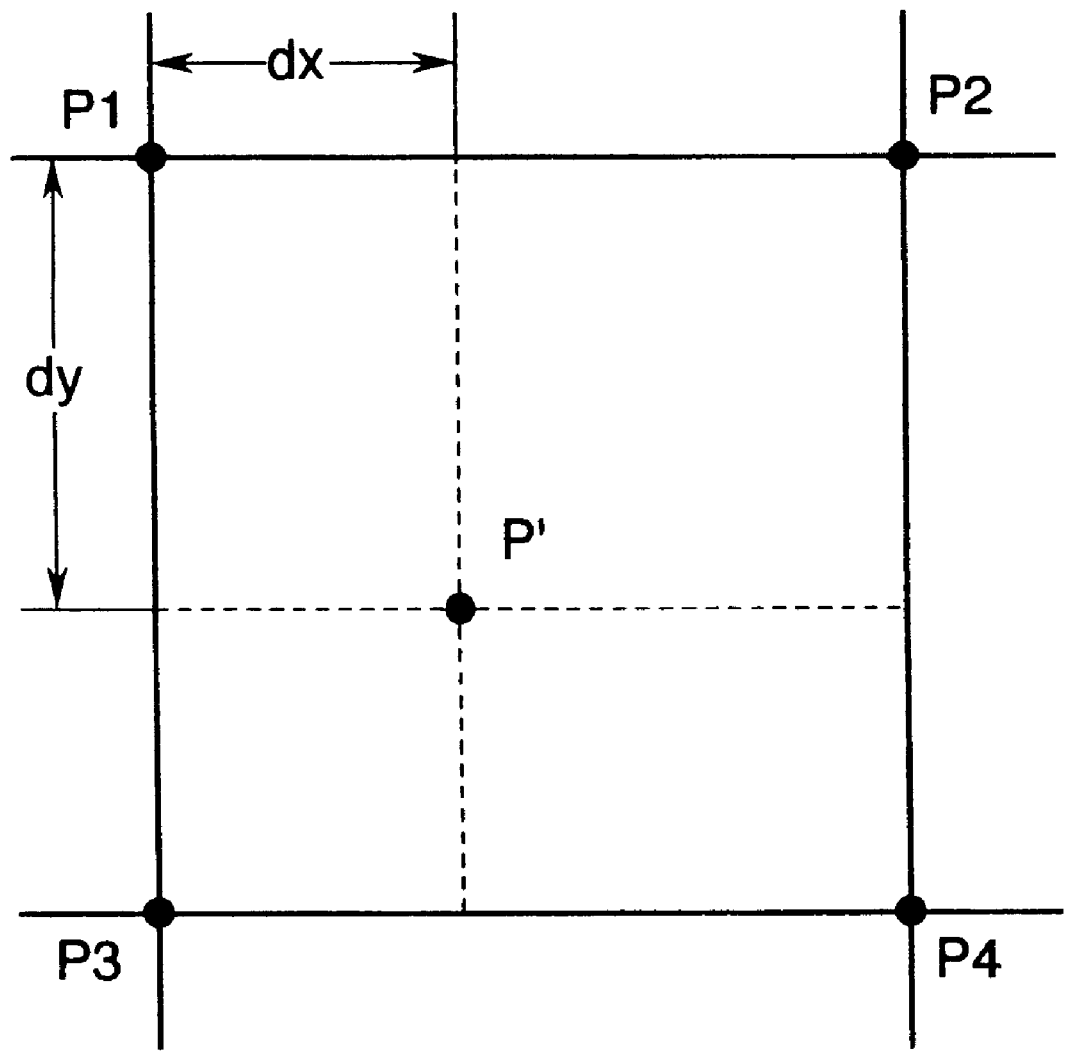
FIG. 5 is a view of the pixel layout for explaining the operation of a linear interpolation circuit arranged in the image enlarging and reducing circuit shown in FIG. 2.

The operation of the address conversion circuit 308 and the operation of the linear interpolation circuit 309 will be described below with reference to FIGS. 4A and 4B, and FIG. 5. FIGS. 4A and 4B are views of the pixel layout for explaining the operation of the address conversion circuit arranged in the image enlarging and reducing circuit shown in FIG. 2. FIG. 4A shows the pixel layout of image data of the NTSC system in the frame memory, and FIG. 4B shows the pixel layout of an image obtained by enlarging a hatched portion in FIG. 4A. FIG. 5 is a view of the pixel layout for explaining the operation of the linear interpolation circuit arranged in the image enlarging and reducing circuit shown in FIG. 2.

The operation of the address conversion circuit 308 in the recording mode will be described below.

If the addresses of a pixel P in FIG. 4B are expressed by (x, y), a corresponding pixel P' has addresses (x', y') on the frame memory 106. The addresses (x', y') of the pixel P' are calculated based on equations (10) and (11) below:

x'=reading start x address+x/horizontal enlargement ratio     (10)

y'=reading start y address+y/vertical enlargement ratio     (11)

Since the calculated addresses x' and y' do not normally assume integers, a corresponding pixel on the frame memory 106 cannot be uniquely specified by the addresses x' and y'.

Likewise, in the reproduction operation mode, the addresses are calculated based on equations (10) and (11) above. When each enlargement ratio is smaller than 1 (reducing mode), addresses are similarly calculated based on equations (10) and (11) above.

Therefore, the linear interpolation circuit 309 performs linear interpolation for specifying a corresponding pixel on the frame memory 106.

The operation of the linear interpolation circuit 309 in the recording or reproduction mode will be explained below.

The following description will exemplify linear interpolation using four pixels, and the linear interpolation circuit 309 performs the same operation in both the recording and reproduction modes.

Assume that a pixel P' in FIG. 5 corresponds to the pixel P' in FIG. 4A, and pixels P1, P2, P3, and P4 on the frame memory 106 have addresses closest to those of the pixel P'. In this case, dx represents the difference between the x addresses of the pixels P1 and P', and dy represents the difference between the y addresses of the pixels P1 and P'. Note that the differences dx and dy respectively satisfy the following relations:

$0 \leq dx < 1$ $0 \leq dy < 1$

The linear interpolation circuit 309 outputs addresses corresponding to the pixels P1, P2, P3, and P4 from the output terminal 310 to the frame memory 106, and fetches corresponding pixel data from an input terminal 311. Let p1', p2', p3', and p4' be the values of the fetched pixel data, and p' be the value of the pixel P'. Then, p' is calculated by equation (12) below:

$$p' = (1-dx)\{p1 \times (1-dy) + p3 \times dy\} + dx\{p2 \times (1-dy) + p4 \times dy\} \quad (12)$$

The recording operation of the digital image recording/reproduction apparatus will be described below.

In the recording operation, the operation mode is set to be the recording mode. Upon setting the recording mode, the selection switches 104 and 105 respectively select the REC terminals on the basis of a control signal from the control circuit.

Then, a zoom ratio is set by the user's operation, and the enlargement ratios for the enlarging and reducing processing of the image enlarging and reducing circuit 108 are set by the image enlargement ratio setting circuit 107 in correspondence with the zoom ratio.

An electrical signal output from the CCD 101 is converted by the A/D 102 into image data, and the converted image data is stored in the frame memory 106 for each frame. The image data for one frame stored in the frame memory 106 is sequentially read out, and the readout image data is supplied to the image enlarging and reducing circuit 108.

The image enlarging and reducing circuit 108 performs enlarging and reducing processing for the image data read out from the frame memory 106. In this enlarging and reducing processing, as described above, the enlarging and reducing processing is executed in accordance with the enlargement ratios set by the image enlargement ratio setting circuit 107, i.e., electronic zoom processing is executed as needed, and image data having a predetermined number of pixels (e.g., 720×480 pixels) is output.

The image data output from the image enlarging and reducing circuit 108 is supplied to the recording system circuit 109 via the selection switch 105 that selected the REC terminal, and the recording system circuit 109 digitally records the input image data on a recording medium such as a magnetic tape.

The reproduction operation will be described below. The following description will exemplify a case wherein a reproduced image is printed by a video printer having a digital I/F and a frame memory for 640×480 pixels.

The operation mode is set to be the reproduction mode. Upon setting this mode, the selection switches 104 and 105 respectively select the PB terminals on the basis of a control signal.

The image enlargement ratio setting circuit 107 sets enlargement ratios for the pixel conversion processing of the image enlarging and reducing circuit 108. As the enlargement ratios for the pixel conversion processing, the vertical and horizontal enlargement ratios are set, so that the number of pixels of image data read out from the frame memory 106 equals that corresponding to the video printer selected by the user. More specifically, as described above, image data reproduced by the reproduction system circuit 110 is stored in the frame memory 110 for each frame. The image data for one frame stored in the frame memory 106 is sequentially read out, and the readout image data is supplied to the image enlarging and reducing circuit 108.

The image enlarging and reducing circuit 108 performs pixel conversion processing for the image data read out from the frame memory 106. In this pixel conversion processing, the number of pixels of the image data read out from the frame memory 106 is converted into that (640×480) matching the video printer in correspondence with the enlargement ratios set by the image enlargement ratio setting circuit 107, and the image data with the converted number of pixels is output to the digital I/F 111 via the selection switch 105.

The digital I/F 111 supplies the input image data to the video printer, and the video printer can form the input image data on a transfer medium without performing any pixel conversion processing for input image data.

As described above, since the image enlarging and reducing circuit 108 has an arrangement common to the recording and reproduction modes, image enlarging processing (electronic zoom processing) and pixel conversion processing can be attained by a single circuit, thus constituting a low-cost recording/reproduction system.

Note that the present invention may be practiced in various other forms without departing from the spirit or principal features of the invention.

For example, this embodiment has exemplified a digital image recording/reproduction apparatus. However, the present invention is not limited to the digital recording/reproduction apparatus. For example, the present invention may be applied to an analog image recording/reproduction apparatus when the recording system circuit 109 shown in FIG. 1 performs D/A conversion processing for a digital image signal and records the converted signal on a recording medium, and the reproduction system circuit 110 performs A/D conversion processing for an analog image signal reproduced from the recording medium.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:
   a) input means for inputting an image signal;
   b) signal processing means for adaptively performing one of electronic zoom processing and pixel conversion processing for the image signal; and
   c) output means for outputting the image signal processed by said signal processing means to an external equipment,
   wherein said signal processing means performs the processing according to characteristics of said external equipment.

2. An apparatus according to claim 1, wherein said input means comprises image pickup means for generating the image signal.

3. An apparatus according to claim 1, further comprising recording means for recording the image signal processed by said signal processing means.

4. An apparatus according to claim 3, further comprising reproduction means for reproducing the image signal recorded on the recording medium.

5. A video camera which mounts the image processing apparatus according to claim 1.

6. An image processing apparatus comprising:
   a) input means for inputting an image signal;
   b) signal processing means for adaptively performing one of electronic zoom processing and pixel conversion processing for the image signal;
   c) recording means for recording the image signal on a recording medium; and
   d) reproduction means for reproducing the image signal recorded on the recording medium, and
      wherein said signal processing means can perform the electronic zoom processing for the image signal to be recorded on the recording medium in a recording operation mode, and can perform the pixel conversion processing for the image signal reproduced from the recording medium in a reproduction operation mode.

7. An apparatus according to claim 6, further comprising output means for externally outputting the image signal subjected to the pixel conversion processing by said signal processing means.

8. An apparatus according to claim 6, wherein said input means comprises image pickup means for generating the image signal.

9. An image processing device comprising:
   a) input means for inputting a digital image signal;
   b) signal processing means capable of adaptively executing a first processing mode for performing image electronic zoom processing for the digital image signal, and a second processing mode for converting a pixel aspect ratio of the digital image signal; and
   c) output means for outputting the image signal processed by said signal processing means to an external equipment,
      wherein said signal processing means performs the processing according to characteristics of said external equipment.

10. A device according to claim 9, further comprising recording means for recording the digital image signal processed by said signal processing means on a recording medium.

11. A device according to claim 10, further comprising reproduction means for reproducing the digital image signal from the recording medium, and
    wherein said signal processing means executes the processing for the digital image signal reproduced by said reproduction means.

12. A device according to claim 11, wherein said signal processing means can execute the first processing mode in a recording mode, and can execute the second processing mode in a reproduction mode.

13. A device according to claim 11, further comprising output means for externally outputting the digital image signal subjected to the second processing mode by said signal processing means.

14. A video camera which mounts the image processing device according to claim 10.

15. An image processing method comprising the steps of:
    a) inputting an image signal;
    b) adaptively performing one of electronic zoom processing and pixel conversion processing for the image signal; and
    c) outputting the image signal processed by said processing performing step to an external equipment,
       wherein said processing performing step performs the processing according to characteristics of said external equipment.

16. An image processing method comprising the steps of:
    a) inputting a digital image signal;
    b) adaptively executing a first processing mode for performing image electronic zoom processing for the digital image signal, and a second processing mode for converting a pixel aspect ratio of the digital image signal; and
    c) outputting the image signal processed by said processing executing step to an external equipment,
       wherein said processing executing step executes the processing according to characteristics of said external equipment.

17. An image processing device comprising:
    a) input means for inputting a digital image signal;
    b) signal processing means capable of adaptively executing a first processing mode for performing image electronic zoom processing for the digital image signal, and a second processing mode for converting a pixel aspect ratio of the digital image signal;
    c) recording means for recording the digital image signal on a recording medium; and
    d) reproduction means for reproducing the digital image signal recorded on the recording medium, and
       wherein said signal processing means can execute the first processing mode in a recording mode, and can execute the second processing mode in a reproduction mode.

18. An apparatus according to claim 17, wherein said input means comprises image pickup means for generating the image signal.

19. A video camera which mounts the image processing apparatus according to claim 17.

20. An image processing method comprising the steps of:
    a) inputting an image signal;
    b) adaptively performing one of electronic zooming processing and pixel conversion processing for the image signal;
    c) recording the image signal on a recording medium; and
    d) reproducing the image signal recorded on the recording medium, and
       wherein said signal processing step can perform the electronic zoom processing for the image signal to be recorded on the recording medium in a recording operation mode, and can perform the pixel conversion processing for the image signal reproduced from the recording medium in a reproduction operation mode.

21. An image processing method comprising the steps of:
    a) inputting a digital image signal;
    b) adaptively executing a first processing mode for performing image electronic zoom processing for the digital image signal, and a second processing mode for converting a pixel aspect ratio of the digital image signal;
    c) recording the digital image signal on a recording medium; and d) reproducing the digital image signal recorded on the recording medium, and
   wherein said signal processing step can execute the first processing mode in a recording mode, and can execute the second processing mode in a reproduction mode.

22. An apparatus according to claim 1, wherein said signal processing means includes a memory for storing the image signal and uses said memory in common in an electronic zoom processing and a pixel conversion processing.

23. An apparatus according to claim 22, wherein the pixel conversion processing is a processing for converting a pixel aspect ratio of the image signal.

24. A video camera which mounts the image processing apparatus according to claim 1.

25. An apparatus according to claim 1, further comprising recording means for recording the image signal processed by said signal processing means, on a recording medium.

26. An apparatus according to claim 25, wherein said input means includes reproducing means for reproducing the image signal from the recording medium.

27. An apparatus according to claim 6, wherein said signal processing means includes a memory for storing the image signal and uses said memory in common in an electronic zoom processing and a pixel conversion processing.

28. An apparatus according to claim 27, wherein the pixel conversion processing is a processing for converting a pixel aspect ratio of the image signal.

29. A video camera which mounts the image processing apparatus according to claim 6.

30. A device according to claim 9, wherein said signal processing means includes a memory for storing the image signal and uses said memory in common in an electronic zoom processing and a pixel conversion processing.

31. A method according to claim 15, wherein the electronic zoom processing and the pixel conversion processing are performed using a common memory.

32. A method according to claim 31, wherein the pixel conversion processing is a processing for converting a pixel aspect ratio of the image signal.

33. A method according to claim 16, wherein the electronic zoom processing and the pixel conversion processing are performed using a common memory.

34. A device according to claim 13, wherein said signal processing means includes a memory for storing the image signal and uses said memory in common in an electronic zoom processing and a pixel conversion processing.

35. A method according to claim 20, wherein the electronic zoom processing and the pixel conversion processing are performed using a common memory.

36. A method according to claim 35, wherein the pixel conversion processing is a processing for converting a pixel aspect ratio of the image signal.

37. A method according to claim 21, wherein the electronic zoom processing and the pixel conversion processing are performed using a common memory.

* * * * *

UNITED STATES PATENT AND TRADEMARK OFFICE
CERTIFICATE OF CORRECTION

PATENT NO. : 5,960,154
DATED : September 28, 1999
INVENTOR(S) : Shinji Ohnishi, et al.

It is certified that error appears in the above-identified patent and that said Letters Patent are hereby corrected as shown below: On the title page:

Col. 1, item [54], delete "IMAGE PROCESSING APPARATUS HAVING ENLARGEMENT REDUCTION AND PIXEL PROCESSING FACILITIES " and insert --IMAGE PROCESSING APPARATUS HAVING ENLARGEMENT/REDUCTION AND PIXEL PROCESSING FACILITIES--.

Signed and Sealed this

Seventeenth Day of April, 2001

Attest:

NICHOLAS P. GODICI

*Attesting Officer*    Acting Director of the United States Patent and Trademark Office